United States Patent
Oki et al.

(10) Patent No.: US 6,399,540 B1
(45) Date of Patent: Jun. 4, 2002

(54) POROUS TITANIA, CATALYST COMPRISING THE POROUS TITANIA

(75) Inventors: Yasuyuki Oki; Hironobu Koike; Yoshiaki Takeuchi, all of Niihama (JP)

(73) Assignee: Sumitomo Chemical Co., Ltd., Osaka (JP)

(*) Notice: Subject to any disclaimer, the term of this patent is extended or adjusted under 35 U.S.C. 154(b) by 0 days.

(21) Appl. No.: 09/635,078

(22) Filed: Aug. 9, 2000

(30) Foreign Application Priority Data

Dec. 8, 1999 (JP) ............................................. 11-228474

(51) Int. Cl.$^7$ ........................... B01J 23/00; C04B 38/02; D02G 3/00; B32B 17/10; C01G 23/047
(52) U.S. Cl. ................. 502/350; 502/309; 502/312; 502/315; 502/349; 501/84; 501/95.1; 428/364; 428/401; 428/436; 428/439; 428/440; 428/442; 423/598; 423/610
(58) Field of Search ................. 502/350, 351, 502/309, 305, 308, 312, 314, 315, 321, 326, 331, 339, 349, 353, 355; 501/84, 95.1; 428/364, 401; 106/436, 439, 440, 442; 423/598, 610

(56) References Cited

U.S. PATENT DOCUMENTS

| 4,166,147 A | | 8/1979 | Lange et al. ................. 428/328 |
|---|---|---|---|
| 4,176,089 A | | 11/1979 | Cull ............................ 252/452 |
| 5,162,283 A | * | 11/1992 | Moini ........................... 502/350 |
| 5,248,637 A | * | 9/1993 | Taneda et al. ................ 501/35 |
| 6,086,844 A | * | 7/2000 | Koike et al. ................. 423/598 |
| 6,162,759 A | * | 12/2000 | Oki et al. .................... 502/350 |
| 6,191,067 B1 | * | 2/2001 | Koike et al. ................ 502/350 |

FOREIGN PATENT DOCUMENTS

| JP | 10-325021 | 12/1998 |
|---|---|---|
| JP | 11-5036 | 1/1999 |

* cited by examiner

Primary Examiner—Elizabeth D. Wood
Assistant Examiner—Patricia L Hailey
(74) Attorney, Agent, or Firm—Fitch, Even, Tabin & Flannery

(57) ABSTRACT

The present invention provides a porous titania, which has an anatase-form crystalline structure, an anatase-form crystallite diameter of 3 nm to 10 nm, a degree of anatase crystallinity of 60% or more, a BET specific surface area of 10 m$^2$/g or more, a total pore volume of 0.05 cm$^3$/g or more, and a volume for pores having a pore radius of 1 nm or more of 0.02 cm$^3$/g or more, and the porous titania and the catalyst comprising the porous titania of the present invention exhibit an excellent catalytic activity for removal of nitrogen oxides, oxidation of organic substances, decomposition of dioxine compounds, as well as decomposition and removal of organic solvents, agricultural chemical and surfactant.

7 Claims, No Drawings

POROUS TITANIA, CATALYST COMPRISING THE POROUS TITANIA

BACKGROUND OF THE INVENTION

1. Technical Field of the Invention

The present invention relates to a porous titania, a catalyst comprising the porous titania, a method for producing the porous titania and a method for the catalyst comprising the porous titania. Specifically, the present invention relates to a porous titania which can be used as a catalyst, and a catalyst comprising the porous titania, which can be used for removal of nitrogen oxides, oxidation of organic substances, decomposition of dioxine compounds, or decomposition and removal of organic solvents, surfactant and the like.

2. Description of the Related Art

Titania catalysts are known as catalysts for removal of nitrogen oxides in order to remove nitrogen oxides contained in waste gases from incinerators. Various improvements have previously been proposed for titania catalysts in order to attain long term retaining of catalyst activity. For example, JP-A-5-184923 discloses that a titania catalyst can be obtained by heat-treating amorphous fibers to deposit a crystal of an anatase-form titanium oxide and a vanadium oxide, in which amorphous fibers is produced by the sol-gel method of hydrolyzing a alkoxide in a mixed solution of a titanium alkoxide, a vanadium compound and other alkoxide, successively gelling.

The titania catalyst described in JP-A-5-184923, however, has problems in that the activity is low and the performance of removal of nitrogen oxides is low.

SUMMARY OF THE INVENTION

An object of the present invention is to provide a porous titania which can be used as a catalyst for removal of nitrogen oxides, oxidation of organic substances, decomposition of dioxine compounds, or decomposition and removal of organic solvents, surfactant and the like.

An other object of the present invention is to provide a catalyst comprising the porous titania, which can be used for removal of nitrogen oxides, oxidation of organic substances, decomposition of dioxine compounds, or decomposition and removal of organic solvents, surfactant and the like.

An other object of the present invention is to provide a method for producing the porous titania.

An other object of the present invention is to provide a method for producing the catalyst comprising the porous titania.

The present inventors have devoted intensive efforts to improving catalytic activity of titania. As a result, the present inventors have discovered a porous titania having a high degree of anatase crystallinity, a large specific surface area and a large pore volume, which is obtainable by adding a mixed solution containing water and a solvent to the titanium alkoxide solution to perform hydrolysis and simultaneous polymerization to give a polymer solution, adding a fatty acid to the titanium alkoxide solution or the polymer solution, separating a polymer containing the fatty acid from the polymer solution, and calcining the polymer containing the fatty acid, which exhibits an excellent catalytic activity for removal of nitrogen oxides and the like.

Therefore, the present invention provides a porous titania, which has an anatase-form crystalline structure, an average crystallite diameter of 3 nm to 10 nm, a degree of anatase crystallinity of 60% or more, a BET specific surface area of 10 $m^2$/g or more, a total pore volume of 0.05 $cm^3$/g or more, and a volume of pores having a pore radius of 1 nm or more of 0.02 $cm^3$/g or more.

The present invention also provides a catalyst formed by molding the porous titania described above.

The present invention also provides a catalyst comprising the porous titania described above and at least one catalyst component selected from the group consisting of V, W, Al, As, Ni, Zr, Mo, Ru, Mg, Ca, Fe, Cr and Pt.

The present invention also provides a method for producing the porous titania described above, which comprises the steps of:

dissolving a titanium alkoxide in a solvent to give a titanium alkoxide solution;

adding a mixed solution containing water and a solvent to the titanium alkoxide solution to perform hydrolysis and simultaneous polymerization to give a polymer solution;

adding a fatty acid to the titanium alkoxide solution or the polymer solution;

separating a polymer containing the fatty acid from the polymer solution; and calcining the polymer containing the fatty acid.

The present invention also provides a method for producing the catalyst described above, which comprises the steps of:

dissolving a titanium alkoxide in a solvent to give a titanium alkoxide solution;

adding a mixed solution containing water and a solvent to the titanium alkoxide solution to perform hydrolysis and simultaneous polymerization to give a polymer solution;

adding a fatty acid to the titanium alkoxide solution or the polymer solution;

adding at least one catalyst component selected from the group consisting of V, W, Al, As, Ni, Zr, Mo, Ru, Mg, Ca, Fe, Cr and Pt to the titanium alkoxide solution or the polymer solution;

separating a polymer containing the fatty acid and the catalyst component from the polymer solution; and calcining the polymer containing the fatty acid and the catalyst component.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Titania has a chemical formula: $TiO_2$ and is known to have a crystalline structure of anatase-form, rutile-form or amorphous structure. The porous titania of the present invention has an anatase-form crystalline structure and has here a requirement that its crystallite diameter is about 3 nm or more and about 10 nm or less as calculated by the Scherrer's equation based on a half width of peak and a peak position in (101) plane of anatase obtained by X-ray diffraction method. It is preferred that the crystallite diameter is about 5 nm or more and about 9 nm or less.

The second requirement for identifying the porous titania of the invention is a degree of anatase crystallinity. The degree of anatase crystallinity can be calculated by measuring a peak area of (101) plane of anatase by X-ray diffraction method. In the present invention, it is required that the degree of anatase crystallinity is about 60% or more. It is preferred that the degree of anatase crystallinity is about 65% or more, further about 70% or more, and about 95% or less, further about 90% or less. It is difficult to obtain a sufficient activity as a catalyst when the porous titania has the degree of anatase crystallinity of less than about 60%, even if the anatase crystallite diameter as described above falls within a range of about 3 nm to about 10 nm.

Other requirements for identifying the porous titania of the invention is a BET specific surface area, a total pore volume and a volume for pores having a pore radius of about 1 nm or more. In the present invention, it is required that the BET specific surface area is about 10 m²/g or more, the total pore volume is about 0.05 cm³/g or more, and the volume for pores having a pore radius of about 1 nm or more is about 0.02 cm³/g or more. It is preferred that the BET specific surface area is about 180 m²/g or more, further about 200 cm²/g or more, the total pore volume is about 0.2 cm³/g or more, and the volume for pores having a pore radius of about 1 nm or more is about 0.2 cm³/g or more. It is difficult to obtain a porous titania having an excellent catalytic activity when the BET specific surface area is less than about 10 m²/g, the total pore volume is less than about 0.05 cm³/g, or the volume for pores having a pore radius of about 1 nm or more is less than about 0.02 cm³/g. The BET specific surface area, the total pore volume, and the volume for pores having a pore radius of about 1 nm or more can be measured by continuous volume method using nitrogen gas.

In addition to fact that the porous titania of the invention meets the requirements relating to the anatase crystallite diameter, the degree of anatase crystallinity, the BET specific surface area, the total pore volume, and the volume for pores having a pore radius of about 1 nm or more, it is preferred that it has a pore structure exhibiting a maximum in a range of a pore radius of about 1 nm or more and about 30 nm or less, preferably about 1 nm or more and about 10 nm or less, in a distribution curve of pore volumes plotted against pore radii. Particularly, when the porous titania of the present invention has a fibrous shape, the fibrous porous titania having a pore structure described above is excellent in the catalytic activity and has a sufficient tensile strength. The fibrous porous titania has usually a tensile strength of about 0.1 GPa or more and an average diameter of fibers of about 2 μm to about 50 μm.

The catalyst of the present invention comprises the porous titania of the present invention and known catalyst components for removal of nitrogen oxides or others. The catalyst components include elements such as V, W, Al, As, Ni, Zr, Mo, Ru, Mg, Ca, Fe, Cr, Pt and the like.

By molding the porous titania and the catalyst of the present invention into various shapes such as sphere, ring, honeycomb, fiber or sheet by using a known method, the porous titania and the catalyst of the invention are usually used for removal of nitrogen oxides, and in addition, for oxidation of organic substances, decomposition of dioxine compounds or decomposition and removal of organic solvents, agricultural chemicals or surfactants in water.

The porous titania of the present invention can be obtained, for example, by a method comprising: dissolving a titanium alkoxide in a solvent to give a titanium alkoxide solution; adding a mixed solution containing water and a solvent to the titanium alkoxide solution to perform hydrolysis and simultaneous polymerization to give a polymer solution; adding a fatty acid to the titanium alkoxide solution or the polymer solution; separating a polymer containing the fatty acid from the polymer solution; and calcining the polymer containing the fatty acid.

The titanium alkoxide used in the production of the porous titania of the invention includes titanium alkoxides represented by the following formula (I):

$$Ti(OR_1)_4 \qquad (I)$$

wherein $R_1$ represents an alkyl group having 1 to 4 carbon atoms. Examples include titanium tetramethoxide, titanium tetra-ethoxide, titanium tetra-n-propoxide, titanium tetra-isopropoxide, titanium tetra-n-butoxide, titanium tetra-sec-butoxide, titanium tetra-tert-butoxide. Amongst them, application of titanium tetra-isopropoxide is preferred. When $R_1$ in the formula (I) is an alkyl group having 5 or more carbon atoms, the mechanical strength of the obtained porous titania may be low.

For the solvent used, any solvent capable of dissolving a titanium alkoxide can be applied. Examples include alcohols, ethers and aromatic hydrocarbons. The alcohols include compounds represented by the following formula (II):

$$R_2OH \qquad (II)$$

wherein $R_2$ represents an alkyl group having 1 to 4 carbon atoms.

Examples include ethanol, isopropyl alcohol and the like. The ethers include tetrahydrofuran, diethyl ether and the like. It is preferred that the solvent used for dissolving the titanium alkoxide is of the same kind as the solvent used for preparation of the mixed solution containing water and the solvent to be added for hydrolysis purpose. The amount of the solvent used for dissolving the titanium alkoxide is usually within a range of about 0.5 to about 50 moles based on 1 mole of titanium alkoxide.

The fatty acid to be used includes compounds represented by the following formula (III):

$$R_3COOH \qquad (III)$$

wherein $R_3$ represents hydrogen or a saturated or unsaturated hydrocarbon residue.

Examples of the saturated fatty acid include formic acid, acetic acid, propionic acid, butyric acid, isobutyric acid, valeric acid, caproic acid, enanthylic acid, caprylic acid, pelargonic acid, capric acid, undecylic acid, lauric acid, tridecylic acid, myristic acid, pentadecylic acid, palmitic acid, heptadecylic acid, isostearic acid, nonadecanic acid, arachic acid, behenic acid, lignoceric acid, cerotic acid, heptacosanic acid, montanic acid, melissic acid, lacceric acid and the like. Examples of unsaturated fatty acid include acrylic acid, crotonic acid, isocrotonic acid, undecylenic acid, oleic acid, elaidic acid, cetoleic acid, erucic acid, brassidic acid, sorbic acid, linolic acid, linoleic acid, arachidonic acid, propiolic acid, stearolic acid and the like. Amongst them, application of fatty acids represented by the formula (III) wherein $R_3$ is a saturated or unsaturated hydrocarbon residue having about 8 or more carbon atoms is preferred. The amount of the fatty acid in the polymer solution depends on the kind thereof and is not critical. Usually, it is about 0.01 mole or more, preferably about 0.05 mole or more and about 0.5 mole or less, preferably about 0.3 mole or less based on 1 mole of titanium alkoxide used for the preparation of the polymer solution. When the amount of fatty acid is less than about 0.01 mole, a porous titania having an excellent catalytic activity may not be obtained. When the amount of fatty acid is greater than about 0.5 mole, the mechanical strength of the porous titania obtained may be low.

The fatty acid may exist by any means in which it is in the predetermined amount in the polymer solution, and may be present, for example, by a method in which the fatty acid is added to the titanium alkoxide solution or a method in which the fatty acid is added to the polymer solution.

In a method for producing the catalyst of the present invention, a compound or the like containing at least one element selected from the group consisting of V, W, Al, As, Ni, Zr, Mo, Ru, Mg, Ca, Fe, Cr and Pt as catalyst components is added to the titanium alkoxide solution or a method in which the fatty acid is added to the polymer solution as addition of the fatty acid.

The compound includes vanadium compounds such as vanadium alkoxides, vanadyl alkoxides, triethoxy vanadyl, vanadium acatylacetonate, vanadium chloride and vanadyl chloride; tungsten compounds such as tungsten alkoxides and tungsten chloride; aluminum compounds such as aluminum alkoxides and aluminium chloride; arsenic compounds such as arsenic chloride; nickel compounds such as nickel alkoxide and nickel chloride; zirconium compounds such as zirconium alkoxides, zirconium acetylacetonate, zirconium butoxyacetylacetonate and zirconium tetrabutoxide; molybdenum compounds such as molybdenum oxyacetylacetonate and molybdenum chloride; ruthenium compounds such as ruthenium chloride; magnesium compounds such as magnesium alkoxides, magnesium acetylacetonate and magnesium chloride; calcium compounds such as calcium alkoxides and calcium chloride; iron compounds such as iron alkoxides, iron acetylacetonate and iron chloride; chromium compounds such as chromium alkoxides and chromium acetylacetonate; platinum compounds such as platinum acetylacetonate and platinum chloride; and so on. Amongst them, vanadium alkoxides is a generic name including vanadium methoxide, vanadium ethoxide, vanadium n-propoxide, vanadium isopropoxide, vanadium n-butoxide, vanadium sec-butoxide, vanadium tert-butoxide and the like.

The porous titania having a fibrous shape is described below in detail. The fibrous porous titania can be obtained by a method, which comprises the steps of:

dissolving a titanium alkoxide in a solvent to give a titanium alkoxide solution and adding a mixed solution containing water and a solvent to a titanium alkoxide solution to perform hydrolysis and simultaneous polymerization to give a polymer solution (hereinafter, referred to as step (1));

dissolving the polymer in an organic solvent in which the polymer is soluble to give a spinning solution (hereinafter, referred to as step (2));

spinning the spinning solution to give a precursor fiber (hereinafter, referred to as step (3)); and calcining the precursor fiber (hereinafter, referred to as step (4)).

In this method, a polymer is separated from the polymer solution as a precursor fiber.

The step (1) can be conducted by a method in which a mixed solution of water and a solvent is added to a titanium alkoxide solution obtained by dissolving a titanium alkoxide of the above-described formula (I) in a solvent to hydrolyze titanium alkoxide and simultaneously polymerize. As the solvent used for dissolving the titanium alkoxide and the solvent used for preparing the mixed solution to be added for hydrolysis, various solvents in which titanium alkoxide is soluble can be applied. Examples include alcohols, ethers and aromatic hydrocarbons. The alcohols are represented by the above-described formula (II). The mixed solution has a water content of about 1% by weight to about 50% by weight. The amount to be added is usually within a range of about 1.5 mole to about 4 moles converted to $H_2O$ based on 1 mole of titanium alkoxide used as the raw material.

In the step (1), it is preferred that a mixed solution of water and a solvent is added to a titanium alkoxide solution obtained by dissolving a titanium alkoxide in a solvent to hydrolyze titanium alkoxide and simultaneously polymerize in an inert gas atmosphere such as nitrogen. When a fatty acid represented by the above-describrd formula (III) is added, the method can be carried out by a method in which a fatty acid in the predetermined amount is added to the titanium alkoxide solution. In this case, when the amount of fatty acid is greater than about 0.5 mole, it becomes difficult to obtain a fibrous porous titania having a sufficient tensile strength. It is also possible to add the fatty acid to the polymer solution or the spinning solution.

When catalyst components described above is added, the amount of the catalyst component to be added depends on its use. For example, for the application of removal of nitrogen oxides, the amount converted to oxide is about 0.001% by weight to about 50% by weight based on the obtained titania catalyst. It is also possible to add the catalyst component to the titanium alkoxide solution, the polymer solution or the spinning solution.

In case where a polymer formed in the titanium alkoxide solution precipitates in the step (1), the concentration of the spinning solution can be adjusted after removal of the solvent or partial removal of the solvent. On the other hand, in case where a polymer formed in the titanium alkoxide solution does not precipitate, the concentration of the spinning solution can be adjusted directly.

In the hydrolysis and polymerization of the titanium alkoxide solution in the step (1), it is preferred, concurrently with addition of a mixed solution of water and a solvent, to reflux the titanium alkoxide solution and to distil out the same amount of the solvent as the solvent contained in the mixed solution under addition. By conducting the hydrolysis and polymerization in such manner, lowering of concentration of titanium in the titanium alkoxide solution after the hydrolysis and polymerization can be prevented.

The step (2) can be conducted by a method in which a polymer obtained in the step (1) is dissolved in an organic solvent in which the polymer is soluble in an inert gas atmosphere such as nitrogen gas. For the organic solvent, any solvent capable of dissolving a fatty acid used in the production of the porous titania can be applied. Examples include alcohols such as ethanol, isopropyl alcohol, ethers such as tetrahydrofuran, diethyl ether and aromatic hydrocarbons such as benzene, toluene.

In the step (2), it is preferred that the polymer obtained in the step (1) is dissolved in an organic solvent to give a polymer solution and then the polymer solution is concentrated by heating or reducing pressure so that a spinning solution having a polymer concentration of about 50% by weight to about 80% by weight is prepared. The viscosity of the obtained spinning solution at 40° C. is usually about 10 poise (1 Pa.s) to about 2,000 poise (200 Pa.s) and preferably about 20 poise (2 Pa.s) to about 1,500 poise (150 Pa.s).

The step (3) can be conducted by a method in which a spinning solution obtained in the step (2) is subjected to any kind of spinning such as nozzle-extruding spinning, centrifugal spinning and blow-out spinning. The obtained precursor fiber can be stretched by rotating rolls or a high speed air stream.

The step (4) can be conducted by a method in which a precursor fiber obtained in the step (3), which is contained the fatty acid and the catalyst component, is calcined at about 200 to about 900° C.

It is preferred that the precursor fiber is subjected to steam treatment during, before or after the calcination. The steam treatment may be effected with a thermo-hygrostate or a calciner. Usually, for steam treatment, the temperature is about 70° C. or above, preferably about 85° C. or above, and about 300° C. or below; the partial pressure of steam is about 0.3 atmosphere (0.03 MPa) or above and preferably about 0.5 atmosphere (0.05 MPa) or above; and the contacting period is about 30 minutes or longer, preferably about 1 hour or longer and more preferably about 5 hours or longer. When the steam treatment is conducted during the calcination, the treatment may be carried out with adjustment of heating rate while keeping the predetermined humidity by a method in which steam is blown into a calciner or a method in which water is sprayed. In this case, the precursor fiber is hold in an atmosphere having a high partial pressure of steam of about 0.3 atmosphere (0.03 MPa) or above between a temperature of about 70 to about 300° C. for at least about 30 minutes and thereafter may be calcined in an atmosphere having a lower partial pressure of steam.

In the production of the porous titania of the present invention, a compound having an active hydrogen element may be added to the titanium alkoxide solution. In addition, a silicon compound may be added to the titanium alkoxide solution or the spinning solution. Preferred compound having an active hydrogen element includes a salicylic acid alkyl ester, or β-diketone compound represented by the following formula (IV):

$$R_4COCH_2COR_5 \quad (IV)$$

wherein $R_4$ represents an alkyl group or an alkoxy group having 1 to 4 carbon atoms, and $R_5$ represents an alkyl group or an alkoxy group having 1 to 4 carbon atoms.

Preferred salicylic acid alkyl ester includes ethyl salicylate and methyl salicylate. Preferred β-diketone compound includes ethyl acetoacetate and isopropyl acetoacetate.

The amount of the compound having an active hydrogen element to be added is about 0.05 mole or more, preferably about 0.1 mole or more and about 1.9 mole or less, preferably about 1.0 mole or less, based on 1 mole of titanium alkoxide.

Preferred silicon compound includes alkyl silicate represented by the following formula (V):

$$Si_nO_{n-1}(OR_6)_{2n+2} \quad (V)$$

wherein $R_6$ represents an alkyl group having 1 to 4 carbon atoms, and n represents a number of 1 or more. Amongst them, a compound of the formula (V) wherein $R_6$ is ethyl and n is 4 to 6 is preferable.

The porous titania of the present invention exhibits an excellent catalytic activity for removal of nitrogen oxides, by using it as a catalyst, the removal of nitrogen oxides can be performed effectively. In addition, when the catalyst of the present invention is applied, removal of nitrogen oxides, oxidation of organic substances, decomposition of dioxine compounds, as well as decomposition and removal of organic solvents, agricultural chemical and surfactant can be performed effectively. Furthermore, using the porous titania or the catalyst of the invention, the space required for placing the catalyst can be diminished and the apparatus for waste gas treatment such as the apparatus for removal of nitrogen oxides can be small-sized.

By the method for the production according to the present invention, the porous titania described above can be easily manufactured.

EXAMPLES

The present invention will now be described with reference to Examples, which should not be construed as a limitation upon the scope of the invention.

In the invention, the anatase-form crystallite diameter, the degree of anatase crystallinity, the BET specific surface area and pore volume were measured by methods described below. In Examples, the porous titania having fibrous shape are used.

(1) Anatase-form Crystallite Diameter:

A porous titania was pulverized in a mortar and measured X-ray diffraction spectra by using an X-ray diffraction apparatus (Model RAD-IIA, manufactured by Rigaku Denki Co., Ltd.). The crystallite diameter L (nm) was calculated by the following equation using the obtained half width β (radian) of a peak of (101) plane and a peak position θ (radian).

$$L=K\cdot\lambda/(\beta\cdot\cos\theta)$$

wherein K represents the Scherrer's constant:0.94, and λ (nm) represents a wavelength of X-ray used for measurement(CuKα-ray:0.15406 nm).

(2) Degree of Anatase Crystallinity:

A porous titania was pulverized in a mortar and measured X-ray diffraction spectra by using an X-ray diffraction apparatus (Model RAD-IIA, manufactured by Rigaku Denki Co., Ltd.). The degree of anatase crystallinity A (%) was calculated by the following equation using the obtained peak area $S_1$ of (101) plane.

$$A=S_1/(S_2\cdot X)\times 100$$

wherein $S_2$ represents a peak area of (101) plane of the standard sample (trade name: STT-65C-S, manufactured by Titan Kogyo Kabushiki Kaisha), and X represents a molar fraction of titanium based on the total elements except oxygen in the porous titania.

(3) BET Specific Surface Area ($m^2/g$), Total Pore Volume ($cm^3/g$) and Volume for Pores Having a Pore Radius of 1 nm or More ($cm^3/g$):

These values were obtained by continuous volume method using a nitrogen gas. That is, these values were calculated from a distribution curve of volumes against pore radii which was obtained by using a gas-absorption/desorption analyzer (trade mark: Omunisorp 360, manufactured by Coulter Co., Ltd). In this method, a porous titania was degassed under conditions including a temperature of 130° C., a retention time of 6 hours and a vacuum of $6\times10^{-5}$ Torr (8 MPa) after pulverizing in a mortar.

(4) Removal Test of Nitrogen Oxides:

The 0.2 g of the porous titania was packed in a glass reaction cylinder having a inside diameter of 12 mm φ so that a packing height becomes 5 mm, and a gas prepared by mixing NO gas, $NH_3$ gas, air, $N_2$ and $H_2O$, which contains NO of about 100 ppm, $NH_3$ of about 100 ppm, $O_2$ of about 10% and $H_2O$ of about 20% and has a temperature of 200° C., was passed through at a flow rate of 1 NL/min. The inlet $NO_x$ concentration and the outlet $NO_x$ concentration of the reaction cylinder were measured by an automatic $NO_x$ measuring apparatus (model ECL-77A, manufactured by Yanagimoto Seisakusyo) and the nitrogen oxides removal efficiency (%) was calculated by the following equation:

Nitrogen oxides removal efficiency(%)={[(inlet $NO_x$ concentration)−(outlet $NO_x$ concentration)]/(inlet $NO_x$ concentration)}× 100

Example 1

Into 77.8 g of isopropyl alcohol (extra pure grade reagent, manufactured by Wako Pure Chemical Industries) as a solvent were dissolved 225 g of titanium tetra-isopropoxide (1st grade reagent, manufactured by Wako Pure Chemical Industries) as a titanium alkoxide, 61.9 g of vanadium isopropoxide (manufactured by Nichia Chemical Industries) as a catalyst component and 10.3 g of ethyl acetoacetate (extra pure grade reagent, manufactured by Wako Pure Chemical industries). The mixture was refluxed for 1 hour in a nitrogen atmosphere to give a titanium alkoxide solution.

The amount of the catalyst component added here was 27% by weight converted to vanadium oxide ($V_2O_5$) based on a fibrous porous titania to be obtained. The amount of ethyl acetoacetate added was 0.1 mole based on 1 mole of titanium tetra-isopropoxide.

Then, 32.7 g of water and 294.9 g of isopropyl alcohol were mixed to form a mixed solution having a water concentration of 10% by weight. The amount of water was 2.30 moles based on 1 mole of titanium tetra-isopropoxide.

The titanium alkoxide solution obtained above was refluxed in a nitrogen atmosphere, and simultaneously, while distilling out the solvent, the mixed solution obtained above was added with stirring. The rate of distilling out the solvent was adjusted so that it was almost equal to the rate of feeding of the solvent due to the addition of the mixed solution. The period for addition of the mixed solution was 96 minutes.

When the amount of added water was 1.80 mole per 1 mole of titanium tetra-isopropoxide, precipitation of a polymer began in the titanium alkoxide solution. When the total amount of the mixed solution was added, the titanium alkoxide solution became a polymer slurry.

The obtained polymer slurry was refluxed for 1 hour in a nitrogen atmosphere. Then the solvent was distilled out by heating so that the solution was concentrated until the titanium concentration in the polymer slurry was $2.97 \times 10^3$ mol/g converted to Ti.

To the concentrated polymer slurry was added 273 g of tetrahydrofuran (extra pure grade reagent, manufactured by Wako Pure Chemical Industries) as an organic solvent in a nitrogen atmosphere. The mixture was refluxed for 1 hour to dissolve the polymer.

To the mixture was added 33.8 g of isostearic acid (reagent, manufactured by Wako Pure Chemical Industries) as a fatty acid. The mixture was refluxed for 1 hour to give a polymer solution.

The obtained polymer solution was filtered through a membrane filter of fluorine-contained resin having a pore diameter of 3 μm in a nitrogen atmosphere and heated in order to distil out the mixed solvent consisting of isopropyl alcohol and tetrahydrofuran to give 247 g of a spinning solution. The spinning solution had a viscosity of 50 poise (5 Pa.s) at 40° C.

The spinning solution obtained above was kept at 40° C. and extruded into an air atmosphere having a relative humidity of 60% at 40° C. from a nozzle having a hole diameter of 50 μm using 20 kg/cm2 (2 MPa) nitrogen gas. The product was taken up at a rate of 70 m/min to give precursor fibers.

The obtained precursor fibers were treated with steam in a thermo-hygrostat controlled at a temperature of 85° C. and a relative humidity of 95% for 15 hours. Then they were heated at a rate of 200° C./hour and calcined in the air at 350° C. for 1 hour to give a fibrous porous titania having an anatase-form crystalline structure and a fiber diameter of 15 μm.

Physical properties of the obtained a fibrous porous titania and the nitrogen oxides removal efficiency obtained in the test are shown in Table 1.

Example 2

The procedure in Example 1 was repeated except that the calcination temperature was changed from 350° C. to 400° C. to give a fibrous porous titania.

Physical properties of the obtained fibrous porous titania and the nitrogen oxides removal efficiency obtained in the test are shown in Table 1.

Example 3

The procedure in Example 1 was repeated except that the calcination temperature was changed from 350° C. to 300° C. to give a fibrous porous titania, Physical properties of the obtained fibrous porous titania and the nitrogen oxides removal efficiency obtained in the test are shown in Table 1.

Example 4

Into 67.5 g of isopropyl alcohol (extra pure grade reagent, manufactured by Wako Pure Chemical Industries) as a solvent were dissolved 225 g of titanium tetra-isopropoxide (1st pure grade reagent, manufactured by Wako Pure Chemical Industries) as a titanium alkoxide, 61.9 g of vanadium isopropoxide (manufactured by Nichia Chemical Industries) as a catalyst component and 20.6 g of ethyl acetoacetate (extra pure grade reagent, manufactured by Wako Pure Chemical Industries). The mixture was refluxed for 1 hour in a nitrogen atmosphere to give a titanium alkoxide solution.

The amount of the catalyst component added here was 27% by weight converted to vanadium oxide ($V_2O_5$) based on a fibrous porous titania to be obtained. The amount of ethyl acetoacetate added was 0.2 mole based on 1 mole of titanium tetra-isopropoxide.

Then, 35.5 g of water and 320.5 g of isopropyl alcohol were mixed to form a mixed solution having a water concentration of 10% by weight.

The titanium alkoxide solution obtained above was refluxed in a nitrogen atmosphere, and simultaneously, while distilling out the solvent, the mixed solution obtained above was added with stirring. The rate of distilling out the solvent was adjusted so that it was almost equal to the rate of feeding of the solvent due to the addition of the mixed solution. The period for addition of the mixed solution was 101 minutes.

When the amount of added water was 2.07 mole per 1 mole of titanium tetra-isopropoxide, precipitation of a polymer began in the titanium alkoxide solution. When the total amount of the mixed solution was added, the titanium alkoxide solution became a polymer slurry.

The obtained polymer slurry was refluxed for 1 hour in a nitrogen atmosphere. Then the solvent was distilled out by heating so that the solution was concentrated until the titanium concentration in the polymer slurry was $2.85 \times 10^3$ mol/g converted to Ti.

To the concentrated polymer slurry was added 269 g of tetrahydrofuran (extra pure grade reagent, manufactured by Wako Pure Chemical Industries) as an organic solvent in a nitrogen atmosphere. The mixture was refluxed for 1 hour to dissolve the polymer.

To the mixture was added a solution of 23.8 g of lauric acid (reagent, manufactured by Wako Pure Chemical Industries) as a fatty acid dissolved in 23.8 g of tetrahydrofuran (extra pure grade reagent, manufactured by Wako Pure Chemical Industries). The mixture was refluxed for 1 hour to give a polymer solution.

The obtained polymer solution was filtered through a membrane filter of fluorine-contained resin having a pore diameter of 3 μm in a nitrogen atmosphere and heated in order to distil out the mixed solvent consisting of isopropyl alcohol and tetrahydrofuran to give 249 g of a spinning solution. The spinning solution had a viscosity of 50 poise (5 Pa.s) at 40° C.

The obtained spinning solution was kept at 40° C. and extruded into an air atmosphere having a relative humidity of 60% at 40° C. from a nozzle having a hole diameter of 50 μm using 20 kg/cm² (2 MPa) nitrogen gas to give precursor fibers.

The obtained precursor fibers were treated with steam in a thermo-hygrostat controlled at a temperature of 85° C. and a relative humidity of 95% for 15 hours. Then they were heated at a rate of 200° C./hour and calcined in the air at 350° C. for 1 hour to give a fibrous porous titania having an anatase-form crystalline structure and a fiber diameter of 15 μm.

Physical properties of the obtained fibrous porous titania and the nitorogen oxides removal efficiency obtained in the test are shown in Table 1.

Comparative Example 1

Into 18.1 g of isopropyl alcohol (extra pure grade reagent, manufactured by Wako Pure Chemical Industries) as a solvent were dissolved 225 g of titanium tetra-isopropoxide (1st pure grade reagent, manufactured by Wako Pure Chemical Industries) as a titanium alkoxide, 61.9 g of vanadium isopropoxide (manufactured by Nichia Chemical Industries) as a catalyst component and 41.2 g of ethyl acetoacetate (extra pure grade reagent, manufactured by Wako Pure Chemical Industries). The mixture was refluxed for 1 hour in a nitrogen atmosphere to give a titanium alkoxide solution.

The amount of the catalyst component added here was 27% by weight converted to vanadium oxide ($V_2O_5$) based on a fibrous porous titania to be obtained. The amount of ethyl acetoacetate added was 0.4 mole based on 1 mole of titanium tetra-isopropoxide. Then, 30.6 g of water and 275.8 g of isopropyl alcohol were mixed to form a mixed solution having a water concentration of 10% by weight.

The titanium alkoxide solution obtained above was refluxed in a nitrogen atmosphere, and simultaneously, while distilling out the solvent, the mixed solution obtained above was added with stirring. Then the obtained product was refluxed for 1 hour in a nitrogen atmosphere. The solvent was distilled out by heating so that the solution was concentrated until the titanium concentration in the polymer slurry was $3.27 \times 10^3$ mol/g converted to Ti.

To the concentrated polymer slurry was added 271 g of tetrahydrofuran (extra pure grade reagent, manufactured by Wako Pure Chemical Industries) as an organic solvent in a nitrogen atmosphere. The mixture was refluxed for 1 hour to dissolve the polymer. The mixture was refluxed for 1 hour to give a polymer solution.

The obtained polymer solution was filtered through a fluorine-contained resin membrane filter having a pore diameter of 3 μm in a nitrogen atmosphere and heated in order to distil out the mixed solvent consisting of isopropyl alcohol and tetrahydrofuran to give 197 g of a spinning solution. The spinning solution had a viscosity of 50 poise (5 Pa.s) at 40° C.

The obtained spinning solution was kept at 40° C. and extruded into an air atmosphere having a relative humidity of 60% at 40° C. from a nozzle having a hole diameter of 50 μm using 20 kg/cm² (2 MPa) nitrogen gas to give precursor fibers.

The obtained precursor fibers were treated with steam in a thermo-hygrostat controlled at a temperature of 85° C. and a relative humidity of 95% for 15 hours. Then they were heated at a rate of 200° C./hour and calcined in the air at 400° C. for 1 hour to give a fibrous porous titania having an anatase-form crystalline structure and a fiber diameter of 15 μm.

Physical properties of the obtained fibrous porous titania and the nitrogen oxides removal efficiency obtained in the test are shown in Table 1.

Comparative Example 2

The procedure in. Comparative Example 1 was repeated except that the calcination temperature was changed from 400° C. to 300° C. to give a fibrous porous titania.

Physical properties of the obtained fibrous porous titania and the nitrogen oxides removal efficiency obtained in the test are shown in Table 1.

TABLE 1

| | Physical properties of porous titania | | | | | |
|---|---|---|---|---|---|---|
| | Anatase -form crystallite diameter nm | Degree of anatase crystallinity % | BET specific surface area m²/g | Total pore volume cm³/g | Volume for pores having a pore radius of 1 nm or more cm³/g | Nitrogen oxides removal efficiency % |
| Ex. 1 | 6.8 | 78 | 237 | 0.28 | 0.28 | 81 |
| Ex. 2 | 6.5 | 87 | 181 | 0.24 | 0.24 | 75 |
| Ex. 3 | 6.3 | 66 | 282 | 0.29 | 0.29 | 74 |
| Ex. 4 | 6.3 | 71 | 221 | 0.20 | 0.20 | 70 |
| Comp. Ex. 1 | 6.6 | 53 | 186 | 0.13 | 0.13 | 60 |
| Comp. Ex. 2 | 5.8 | 52 | 232 | 0.22 | 0.08 | 62 |

The invention being thus described, it will be obvious that the same may be varied in many ways. Such variations are not to be regarded as a departure from the sprit and scope of the invention, and such modifications as would be obvious to one skilled in the art are intended to be included within the scope of the following claims.

What is claimed is:

1. A method for producing a porous titania, which comprises the steps of:
    dissolving a titanium alkoxide in a solvent to give a titanium alkoxide solution;
    adding a mixed solution containing water and a solvent to the titanium alkoxide solution to perform hydrolysis and simultaneous polymerization to give a polymer solution;
    adding a fatty acid to the titanium alkoxide solution or the polymer solution;
    separating the polymer containing the fatty acid from the polymer solution; and calcining the polymer containing the fatty acid.

2. A method for producing a porous titania, which comprises the steps of:

dissolving a titanium alkoxide in a solvent to give a titanium alkoxide solution;

adding a mixed solution containing water and a solvent to the titanium alkoxide solution to perform hydrolysis and simultaneous polymerization to give a polymer solution;

dissolving the polymer in an organic solvent in which the polymer is soluble to give a spinning solution;

adding a fatty acid to the titanium alkoxide solution, the polymer solution or the spinning solution;

spinning the spinning solution to give a precursor fiber containing the fatty acid; and calcining the precursor fiber containing the fatty acid.

3. A method for producing a porous titania, which comprises the steps of:

dissolving a titanium alkoxide in a solvent to give a titanium alkoxide solution;

adding a mixed solution containing water and a solvent to the titanium alkoxide solution to perform hydrolysis and simultaneous polymerization to give a polymer solution;

adding a fatty acid to the titanium alkoxide solution or the polymer solution;

adding at least one component selected from the group consisting of V, W, Al, As, Ni, Zr, Mo, Ru, Mg, Ca, Fe, Cr and Pt to the titanium alkoxide solution or the polymer solution;

separating a polymer containing the fatty acid and the component from the polymer solution; and calcining the polymer containing the fatty acid and the component.

4. A method for producing a porous titania, which comprises the steps of:

dissolving a titanium alkoxide in a solvent to give a titanium alkoxide solution;

adding a mixed solution containing water and a solvent to the titanium alkoxide solution to perform hydrolysis and simultaneous polymerization to give a polymer solution;

dissolving the polymer in an organic solvent in which the polymer is soluble to give a spinning solution;

adding a fatty acid to the titanium alkoxide solution, the polymer solution or the spinning solution;

adding at least one component selected from the group consisting of V, W, Al, As, Ni, Zr, Mo, Ru, Mg, Ca, Fe, Cr and Pt to the polymer solution or the spinning solution;

spinning the spinning solution to give a precursor fiber containing the fatty acid and the component; and calcining the precursor fiber containing the fatty acid and the component.

5. A method according to anyone of claims 1 to 4, wherein the polymer or the precursor containing the fatty acid is treated with steam before calcining, during calcining or after calcining.

6. A method according to anyone of claims 1 to 4, wherein the titanium alkoxide is represented by the following formula (I):

$$\text{Ti(OR}_1)_4 \tag{I}$$

wherein $R_1$ represents an alkyl having 1 to 4 carbon atoms.

7. A method according to anyone of claims 1 to 4, wherein the fatty acid is represented by the following formula (III):

$$R_3\text{COOH} \tag{III}$$

wherein $R_3$ represents hydrogen or a saturated or unsaturated hydrocarbon residue.

* * * * *